United States Patent
Tsukamoto (10) Patent No.: US 10,220,715 B2
(45) Date of Patent: Mar. 5, 2019

(54) NON-CONTACT POWER SUPPLY SYSTEM

(71) Applicant: Nissan Motor Co., Ltd., Yokohama-shi, Kanagawa (JP)

(72) Inventor: Yukinori Tsukamoto, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 148 days.

(21) Appl. No.: 14/778,534

(22) PCT Filed: Mar. 24, 2014

(86) PCT No.: PCT/JP2014/058097
§ 371 (c)(1),
(2) Date: Sep. 18, 2015

(87) PCT Pub. No.: WO2014/157096
PCT Pub. Date: Oct. 2, 2014

(65) Prior Publication Data
US 2016/0280078 A1    Sep. 29, 2016

(30) Foreign Application Priority Data

Mar. 29, 2013 (JP) .................................. 2013-072261

(51) Int. Cl.
*B60L 3/00* (2006.01)
*H02J 5/00* (2016.01)
(Continued)

(52) U.S. Cl.
CPC .............. *B60L 11/182* (2013.01); *B60L 3/00* (2013.01); *B60L 11/1825* (2013.01);
(Continued)

(58) Field of Classification Search
CPC ...... B60L 11/182; B60L 11/1846; H02J 7/025
(Continued)

(56) References Cited

U.S. PATENT DOCUMENTS

| 2010/0001687 A1* | 1/2010 | Watanabe ................. B60L 3/12 320/109 |
| 2010/0241542 A1* | 9/2010 | Pinkusevich ....... B60L 11/1816 705/34 |

(Continued)

FOREIGN PATENT DOCUMENTS

| JP | 9-213378 A | 8/1997 |
| JP | 10-304582 A | 11/1998 |

(Continued)

*Primary Examiner* — David V Henze-Gongola
(74) *Attorney, Agent, or Firm* — Global IP Counselors, LLP (57) ABSTRACT

A non-contact power supply system supplies power in a non-contact manner from a power transmission coil of a vehicle to a power reception coil of a power supply device. The power supply device has a power supply side recording means unit records information, a power supply side communication unit that communicates with the vehicle, and a power supply side controller that controls the power output from a power source to the power transmission coil. Vehicle identification information is recorded to the power supply side recording unit during the power supply or during preparation for the power supply to the power reception coil. The power supply side controller cross-checks the vehicle identification information and vehicle information transmitted from the vehicle when the power supply to the power reception coil is stopped before the power supply to the power reception coil is ended normally.

12 Claims, 5 Drawing Sheets

(51) Int. Cl.
  *H02J 7/02*      (2016.01)
  *B60L 11/18*     (2006.01)
  *H02J 50/10*     (2016.01)
  *H02J 50/90*     (2016.01)
  *H02J 17/00*     (2006.01)

(52) U.S. Cl.
  CPC ........... *B60L 11/1846* (2013.01); *H02J 5/005* (2013.01); *H02J 7/025* (2013.01); *H02J 17/00* (2013.01); *H02J 50/10* (2016.02); *H02J 50/90* (2016.02); *B60L 2230/16* (2013.01); *B60L 2250/16* (2013.01); *B60L 2270/32* (2013.01); *Y02T 10/7005* (2013.01); *Y02T 10/7088* (2013.01); *Y02T 90/121* (2013.01); *Y02T 90/122* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
  USPC .................................................. 320/108, 109
  See application file for complete search history.

(56) References Cited

U.S. PATENT DOCUMENTS

| | | | |
|---|---|---|---|
| 2011/0279082 A1* | 11/2011 | Hagenmaier, Jr. | ........................... B60L 11/1824 320/109 |
| 2013/0058379 A1* | 3/2013 | Kim | ..................... H04B 5/0031 375/146 |
| 2013/0110340 A1 | 5/2013 | Park et al. | |
| 2013/0181669 A1* | 7/2013 | Kawasaki | ............. B60L 11/182 320/108 |

FOREIGN PATENT DOCUMENTS

| | | |
|---|---|---|
| JP | 2001-178001 A | 6/2001 |
| JP | 2009-171690 A | 7/2009 |
| JP | 2010-17006 A | 1/2010 |
| JP | 2012-16132 A | 1/2012 |
| JP | 2013-009491 A | 1/2013 |
| JP | 5365366 B2 | 12/2013 |
| KR | 10-2012-0012652 | 2/2012 |
| WO | 2010/150594 A1 | 12/2010 |
| WO | 2012/042902 A1 | 4/2012 |

* cited by examiner

NON-CONTACT POWER SUPPLY SYSTEM

This application is a U.S. National stage application of International Application No. PCT/JP2014/058097, filed Mar. 24, 2014, which claims priority to Japanese Patent Application No. 2013-072261 filed in Japan on Mar. 29, 2013. The entire disclosure of Japanese Patent Application No. 2013-072261 is hereby incorporated herein by reference.

BACKGROUND

Field of the Invention

The present invention relates to a non-contact power supply system.

Background Information

A power supply system of an electric vehicle that supplies power in a non-contact manner from a power supply device provided on the ground to an electric vehicle, in which an 8-bit (256 value) random number is used, and the power supply is performed with a power value Ptest and a predetermined time Ttest generated based on this random number while avoiding the predetermined power value Ptest and the predetermined time Ttest becoming the same value, to establish a communication between a vehicle and a power supply device by determining whether or not the power that is received by a reception unit of a vehicle is the predetermined power value Ptest after the predetermined time Ttest has elapsed, has been disclosed (See, e.g., International Publication No. 2012-042902).

SUMMARY

However, since the above-described power supply system does not give any consideration to cases in which a power failure occurs on the power supply device side, there is a problem that when a power failure occurs, the fact that a power failure has occurred, and there was a target vehicle that was being supplied power during the power failure, cannot be properly grasped.

The problem to be solved by the present invention is to provide a non-contact power supply system that grasps the fact that a power failure has occurred, and there is a target vehicle that was being supplied power at the time of the power failure.

The present invention solves the problem by recording the vehicle identification information, during the power supply or during the preparation for supplying power, to the power reception coil, to a power supply side recording means, and cross-checking the vehicle identification information and the vehicle information that is transmitted from the vehicle.

In the present invention, the fact that a power failure has occurred can be grasped from the recorded vehicle identification information, and a target vehicle that was being supplied power at the time of a power failure can be grasped from the result of cross-checking the recorded vehicle identification information and the information that is transmitted from the vehicle.

BRIEF DESCRIPTION OF THE DRAWINGS

Referring now to the attached drawings which form a part of this original disclosure.

DETAILED DESCRIPTION OF THE EMBODIMENTS

Embodiments of the present invention will be explained below based on the drawings.

First Embodiment

Figure 1:
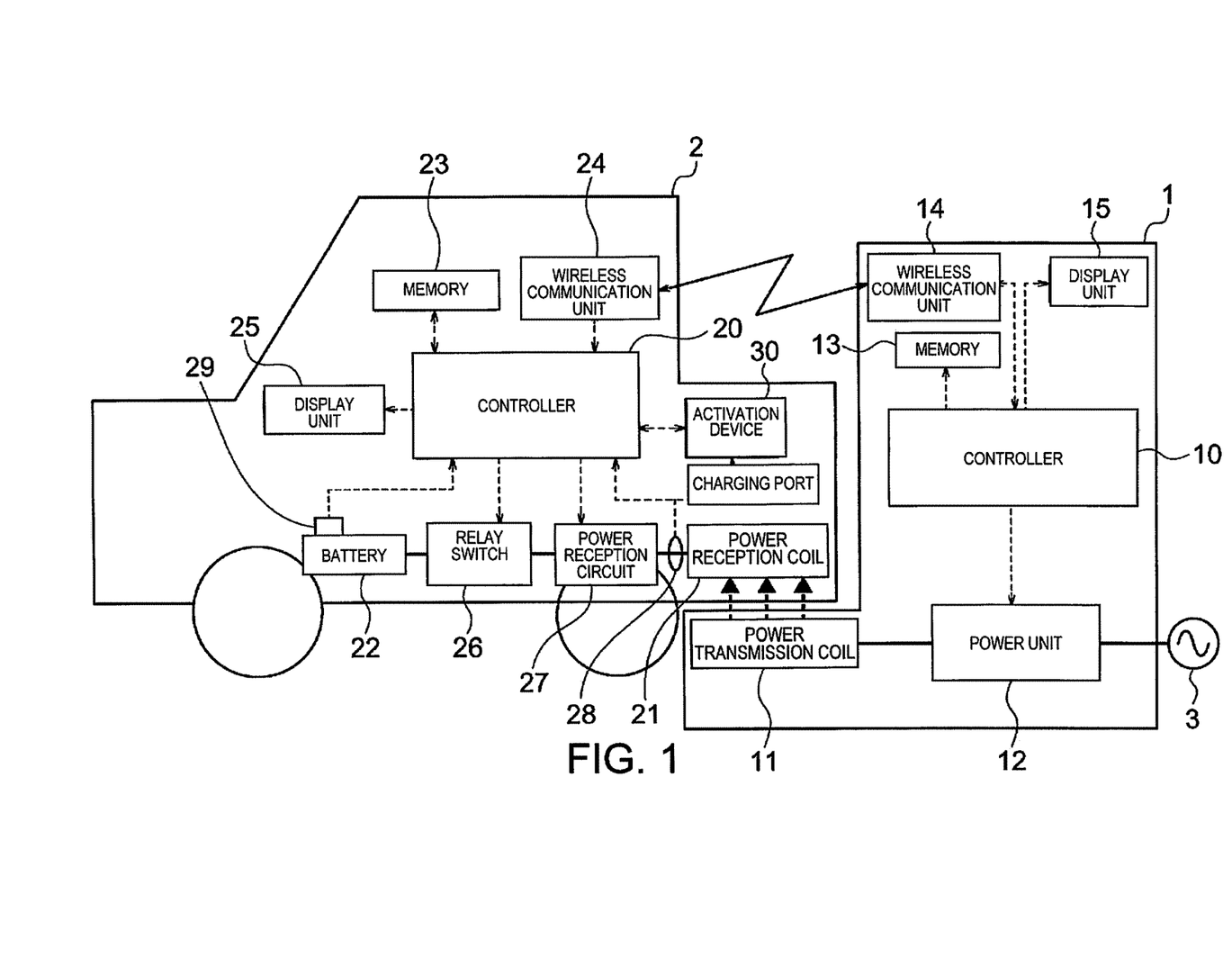
FIG. 1 is a control block diagram view of a non-contact power supply system according to an embodiment of the present invention.

FIG. 1 is a block diagram of a non-contact power supply system according to an embodiment of the present invention. The non-contact power supply system of the present embodiment supplies power in a non-contact manner from a power transmission coil of a power supply device provided on the ground side to a power reception coil on the vehicle side, by means of at least a magnetic coupling. The system then charges a battery of the vehicle by the power that is received by the power reception coil.

Non-contact power supply systems are provided to parking facilities such as parking spaces of homes and shared facilities such as the parking space along a highway. A non-contact power supply system comprises a vehicle 2 and a power supply device 1. The power supply device 1 is provided to a parking space for parking a vehicle 2, and is a ground side unit that supplies power by the non-contact power supply between the coils, when the vehicle 2 is parked in a predetermined parking position. The vehicle 2 is a vehicle 2 that is capable of charging a battery 22 that is provided in the vehicle by an external power source, such as an electric vehicle or a plug-in hybrid vehicle.

The configuration of the power supply device 1 and the vehicle 2, which configure the non-contact power supply system, will be described below. In the present embodiment, a description will be given of an electric vehicle as the vehicle 2. In FIG. 1, the dotted arrows represent respective signal lines between controllers 10 and 20, and the configuration in the power supply device 1 and the configuration in the vehicle 2, and the thick lines represent the power lines upon charging a battery 22 with the power of an AC power source 3.

The power supply device 1 comprises a controller 10, a power transmission coil 11, a power unit 12, a memory 13, a wireless communication unit 14, and a display unit 15.

The controller 10 is a main controller for controlling the entire power supply device 1.

The power transmission coil 11 is a parallel circular shaped coil for supplying the power in a non-contact manner to a power reception coil 21, which is provided on the vehicle 2 side, and is provided in a parking space in which is provided a power supply device 1.

The power unit 12 is a circuit for converting the AC power that is transmitted from an AC power source 3 to a high frequency AC power and transmitting the same to the power transmission coil 11, comprising a rectifier, a power factor correction circuit (PFC (Power Factor Correction) circuit), an inverter, and a sensor for detecting the output value to the power transmission coil 11. The power unit 12 outputs the desired power to the power transmission coil 11 by having a switching element provided to the inverter PWM-controlled by the controller 10.

The memory 13 is a recording medium (a non-volatile memory) for recording the identification information (ID) that is provided to each power supply device 1 in advance, and the information that is transmitted from the vehicle 2 side. The wireless communication unit 14 is a transceiver that performs bidirectional communication with a wireless communication unit 24 that is provided on the vehicle 2 side. A frequency that is different from the frequency that is used in vehicle peripherals, such as the intelligence keys, is set as the communication frequency between the wireless communication unit 14 and the wireless communication unit 24 so that the vehicle peripherals are less susceptible to interference by the communication even if the communication is performed between the wireless communication unit 14 and the wireless communication unit 24. For example, various wireless LAN systems are used for the communication between the wireless communication unit 14 and the wireless communication unit 24. The display unit 15 is a display device for notifying the state of the power supply device 1 to the outside.

The configuration of the vehicle 2 is described next. The vehicle 2 comprises a controller 20, a power reception coil 21, a battery 22, a memory 23, a wireless communication unit 24, a display unit 25, a relay switch 26, a power reception circuit 27, sensors 28 and 29, and an activation device 30.

The controller 20 is not limited to the charging control when charging the battery 22, and performs various controls in the EV system of a vehicle.

The power reception coil 21 is provided on the bottom surface (chassis), etc., of the vehicle 2 between the rear wheels. Then, when the vehicle 2 is parked in a predetermined parking position, the power reception coil 21 is positioned above the power transmission coil 11, while maintaining the distance from the power transmission coil 11. The power reception coil 21 is a circular shaped coil that is parallel to the surface of the parking space.

The battery 22 is a secondary battery that outputs, via an inverter that is not diagrammed, the power to a motor (not shown), which is the power source of the vehicle 2. The battery 22 is configured by connecting a plurality of secondary batteries such as lithium-ion batteries in series or in parallel. The battery 22 is electrically connected to the power reception coil 21 via the relay switch 26 and the power reception circuit 27.

The memory 23 is a recording medium (a non-volatile memory) for recording the identification information (ID) that is provided to each vehicle 2 in advance, and the information that is transmitted from the power supply device 1 side. The wireless communication unit 24 is a transceiver for performing the wireless communication with the wireless communication unit 14 on the power supply device 1 side.

The display unit 25 is provided, for example, to the instrument panel of the vehicle 2 and displays the state of the power supply device 1. The display 25 also displays a guide screen for charging, when charging the battery 22 with the power supply device 1.

The relay switch 26 is a switch for switching between the electric conduction and the interruption between the battery 22 and the power reception circuit 27. The relay switch 26 is controlled by the controller 20. The controller 20 turns the relay switch 26 ON, when charging the battery 22 with the power that is supplied from the power transmission coil 11 to the power reception coil 21 in a non-contact manner.

The power reception circuit 27 is connected between the power reception coil 21 and the battery 22, and comprises a circuit for converting the AC power that is received by the power reception coil 21 to DC power. The sensor 28 is a voltage sensor for detecting the power that is received by the power reception coil 21, and is connected between the power reception coil 21 and the power reception circuit 27. The detection values of the sensor 28 are transmitted to the controller 20 and the activation device 30.

The sensor 29 is a sensor for detecting the charging current or the charging voltage to the battery 22, and is electrically connected to the battery 22. The controller 20 manages the state of the battery 22 based on the detection value of the sensor 29, when charging the battery 22.

The activation device 30 is a device for activating the controller 20 based on the detection value of the sensor 28. A signal line is connected between the activation device 30 and the controller 20. When power is supplied from the power transmission coil 11 to the power reception coil 21, the power reception coil 21 receives the power, and the sensor 28 detects the voltage that is applied due to the reception by the power reception coil 21 and transmits the detection value to the activation device 30. When detecting that the power has been supplied from the power transmission coil 11 to the power reception coil 21 from the detection value of the sensor 28, the activation device 30 transmits an activation signal for activating the controller 20 to the controller 20.

The controller 20 is activated from a sleep state by receiving the activation signal from the activation device 30. Meanwhile, after activation, the controller 20 transmits a signal to put the activation device 30 into a sleep state. The activation device 30 enters a sleep state by receiving the signal.

In addition, for example, when the controller 20 transitions to a sleep state after completing the charging of the battery 22, the controller 20 transmits an activation signal to the activation device 30.

The activation device 30 thereby activates the controller 20 based on the detection value of the sensor 28, when the power transmission coil 11 supplies power to the power reception coil 21 in a non-contact manner, when the controller 20 is in a sleep state.

The control of the non-contact power supply system will be described next.

When the vehicle 2 is parked in a parking space provided with the power supply device 1, the power reception coil 21 faces the power transmission coil 11. When the positional displacement between the power reception coil 21 and the power transmission coil 11 is large, the efficiency of the non-contact power supply drops. Accordingly, the controller 10 detects the relative position of the power reception coil 21 with respect to the power transmission coil 11 with a sensor such as a camera (not shown), and displays an indication urging to re-park on the display unit 15, when the positional displacement between the power reception coil 21 and the power transmission coil 11 is outside of an allowable range.

When the positional displacement between the power reception coil 21 and the power transmission coil 11 is within the allowable range, the controller 10 transmits a signal indicating that accessing the non-contact power supply is possible with the wireless communication unit 14.

Next, the controllers 10 and 20 perform a control to establish a paired communication between the power supply device 1 and the vehicle 2. As a feature of the wireless communication, when transmitting a signal with the wireless communication unit 24 on the vehicle 2 side, a plurality of wireless communication units 14 positioned within the communication range of the wireless communication unit 24 receive the signal. The wireless communication unit 24 of the vehicle 2 can also receive a signal from the wireless communication unit 14 of the power supply device 1, and can also receive a signal from a wireless communication unit 14 of another power supply device 1 other than this power supply device 1. Consequently, even if the vehicle 2 is parked in a parking space to which a power supply device 1 is provided, the power supply device 1 cannot grasp which vehicle has parked, and the vehicle 2 cannot grasp to which parking space of which power supply device 1 the vehicle has parked, by wireless communication alone. Accordingly, the controllers 10 and 20 perform a control (hereinafter referred to as the coupling control) to establish a paired communication (coupling) before charging the battery 22 (in other words, while preparing for the charging of the battery 22), in order to specify the transmission source or the reception destination. This coupling will then be established at the preparation stage of the charging of the battery 22, in other words, the power supply preparation stage for charging the battery 22.

The coupling control is performed, for example, by utilizing the non-contact power supply between the power transmission coil 11 and the power reception coil 21. The power supply device side controller 10 controls the power unit 12 and outputs the power along a predetermined power pattern from the power transmission coil 11 to the power reception coil 21. A power pattern is set in advance by changing the duty, or, the frequency of the power that is intermittently outputted from the power transmission coil. The power supply device side and the vehicle side controllers 10 and 20 have common power patterns. Wireless communication may be used in order to share power patterns between the controllers 10 and 20.

Then, the vehicle side controller 20 measures the power pattern based on the power that is received by the power reception coil 21. If the measured power pattern and a pattern possessed in advance match, the controller 20 determines that a coupling has been established. The controller 20 then transmits a signal indicating that a coupling has been established to the controller 10 on the power supply device side.

Coupling can thereby be established between the power supply device 1 and the vehicle. The coupling control may be a method other than the above, and a non-contact power supply between the power transmission coil 11 and the power reception coil 21 is not necessarily used.

Then, when a coupling has been established, the power supply device side controller 10 records the identification information of the vehicle 2 in the memory 13. The vehicle side controller 20 records the identification information of the power supply device 1 in the memory 23.

When an operation for charging the battery 22 is performed by the user, the controller 20 transmits a signal that requests the power supply to the power supply device side controller 10. The controller 10 controls the power unit 12 to start the non-contact power supply, based on the signal. If a timer setting for charging has been set, the controller 20 may transmit a signal requesting the power supply when the time reaches the time set in the timer.

The controller 20 converts the power that is transmitted from the power transmission coil 11 to the power reception coil 21 to a power that is suitable for charging the battery 22 and outputs the same to the battery 22, by turning the relay switch 26 ON and controlling the power reception circuit 27. The battery 22 is thereby charged by the non-contact power supply system.

The identification information recorded in each memory 13 and 23 is in a state of being recorded in each memory 13 and 23 even during the power supply from the power transmission coil 11 to the power reception coil 21, in other words, during the charging of the battery 22. When performing the wireless communication between the controller 10 and the controller 20, the transmission and the reception of signals are performed using the identification information of the power supply device 1 and the identification information of the vehicle 2, which are stored in each memory 13 and 23.

Additionally, the controller 20 manages the state of the battery 22 during the charging of the battery 22, by detecting the state of the battery 22 with a sensor 29. Then, the controller 20 controls the power reception circuit 27 in accordance with the state of the battery, and adjusts the charging power to the battery 22. When changing the power that is transmitted from the power transmission coil 11, the controller 20 transmits a signal indicating the required power from the power transmission coil 11 to the power reception coil 21, or the state of the battery 22, to the power supply device 1 with the wireless communication unit 24.

Then, the controller 10 adjusts the power that is transmitted from the power transmission coil 11 by controlling the power unit 12 based on the information indicating the required power from the vehicle side or the state of the battery 22, by receiving the signal.

When the charge state of the battery (State of Charge) reaches a target SOC, the controller 20 transmits a signal indicating a request to stop the non-contact power supply to the power supply device 1, in order to stop the charging of the battery 22. The controller 10 stops the operation of the power unit 12 and stops the power supply by the non-contact power supply system, by receiving a stop request signal from the vehicle 2.

Additionally, when stopping the charging of the battery 22 in mid-course, the controller 20 transmits a signal indicating a request to stop the non-contact power supply to the power supply device 1, based on, for example, an operation by the user or the like. In the same way, the controller 10 stops the power supply by the non-contact power supply system based on a stop request signal.

The operation of the charging control by the non-contact power supply system can be performed on the power supply device 1 side as well. For example, when a stop switch (not shown) provided on the power supply device 1 side is turned ON by the user, the controller 10 stops the operation of the power unit 12 and stops the power supply from the power supply device 1. In addition, the controller 10 transmits, to the vehicle side, a stop signal indicating to stop the power supply. The controller 20 controls the power reception circuit 27 to stop the supply of power to the battery 22 by receiving the stop signal. The controllers 10 and 20 thereby cause the charging of the battery 22 by the non-contact power supply system to be stopped.

The control described above is the control of a case in which the power supply from the power transmission coil 11 to the power reception coil 21 is performed normally until the charging of the battery 22 is ended. The non-contact power supply system of the present embodiment assumes a case in which the power transmission from the AC power source 3 to the power supply device 1 is stopped, and comprises a system that is executed upon a power failure. The power failure control of the non-contact power supply system of the present embodiment will be described below. A power failure is not limited to a case in which the supply of the AC power source 3 itself is down, but also occurs, for example, in a case in which the connection cable of the power supply device 1 is disconnected from the AC power source 3, or, if a household power source is used as the power source of the power supply device 1, a case in which the breaker is tripped.

When the power supply to the power reception coil is ended normally, the controller 10 erases the identification information of the vehicle 2 of the power supply destination from the memory 13. A case in which the power supply to the power reception coil is ended normally is a case in which a stop request signal for stopping the power supply is received from the vehicle 2, or, a case in which there is a stop operation by the user on the power supply device side.

On the other hand, if a power failure occurs during the charging of the battery 22 (a state in which a vehicle that is a target of the power supply is stopped in a parking space of the power supply device 1) the system of the controller 10 will go down. Since a charging control of the battery 22 is being performed prior to the power failure, the identification information of the vehicle 2 is already recorded in the memory 13. In the same way, the identification information of the power supply device 1 is already recorded in the memory 23. Since the memory 13 is a non-volatile memory, the identification information of the vehicle 2 will remain in a state of being recorded in the memory 13, even if the system of the controller 10 goes down due to a power failure. In the same way, since the memory 23 is a non-volatile memory, the identification information of the power supply device 1 remains in a state of being recorded in the memory 23, even if the controller 20 enters a sleep state accompanying a system failure of the controller 10 due to a power failure.

When the power failure is restored and power is supplied from the AC power source 3 to the power supply device 1, the controller 10 reads the data recorded in the memory 13. If the identification information of the vehicle 2 is recorded in the memory 13, the controller 10 determines that a power failure has occurred. On the other hand, if the identification information of the vehicle 2 is not recorded in the memory 13, the controller 10 determines that a power failure has not occurred. That is, the identification information of the vehicle of the power supply destination that is recorded in the memory 13 indicates that power was being supplied to the vehicle prior to the power failure (in other words, that the power supply to the vehicle was stopped due to the power failure), and, indicates that the vehicle is the target vehicle to which power was being supplied prior to the power failure.

If the identification information of the vehicle 2 is recorded in the memory 13, the controller 10 activates the wireless communication unit 14 to restart communication.

If a power failure occurs during the charging of the battery 22, the communication between the wireless communication unit 14 and the wireless communication unit 24 is stopped, and the power supply from the power transmission coil 11 to the power reception coil 21 is stopped. Therefore, when detecting that the communication between the wireless communication unit 14 and the wireless communication unit 24 has stopped, and that the power supply from the power transmission coil 11 to the power reception coil 21 has stopped based on the detection value of the sensor 28, the vehicle side controller 20 determines that a power failure has occurred on the power supply device 1 side. At the point in time of this determination, the relay switch 26 is still ON.

When determining that a power failure has occurred, the controller 20 switches from the charging control mode for charging the battery 22 to a power failure control mode. When switching to the power failure control mode, the controller 20 transmits a call signal to the power supply device 1. A call signal is a signal for requesting a power supply again to the power supply device 1, after the charging of the battery 22 has been interrupted. That is, the information of the call signal indicates that the battery 22 had been charging until prior to the power failure. In addition, the call signal comprises the identification information of the vehicle 2. The controller 20 transmits a call signal at a predetermined cycle, during a predetermined transmission continuation period.

The controller 20 puts the system in a sleep state and turns the communication function of the wireless communication unit 24 OFF, if the wireless communication unit 24 does not receive a response signal from the power supply device 1 with respect to the call signal during the transmission continuation period described above. Additionally, the controller 20 also turns the relay switch 26 OFF. When entering a sleep mode in the state of the power failure control mode, the controller 20 does not erase the identification information of the power supply device 1 that is recorded in the memory 23.

On the other hand, when receiving a response signal from the power supply device 1 before the transmission continuation period has elapsed, the controller 20 determines that the power failure has been restored, and restarts the charging control of the battery 22 (returns to the charging control mode).

A power failure may continue for a long period of time, while there are power failures that are restored in a relatively short period (for example, about 2 to 3 minutes). In particular, such brief power failures occur, if the power supply device 1 is installed in a region in which the power supply from the AC power source 3 is routinely unstable. If the wireless communication function is turned OFF by putting the system of the controller 20 to a sleep state at the point in time in which a power failure is determined to have occurred, even though the power failure is only for a short period of time, and, within a short time, the system, including the wireless communication function is activated again, and the power consumption of the battery 22 is increased. In addition, the power consumption of the battery 22 is increased if the wireless communication by the wireless communication unit 24 is continued for a long time exceeding the transmission continuation period.

Furthermore, if an electromagnetic relay is used for the relay switch 26, the response operation of the switch becomes slow. Consequently, even if a command for switching is inputted to the relay switch 26 in response to a brief power failure, there is the risk that the actual operation of the relay switch cannot keep pace.

Accordingly, in the present embodiment, when an occurrence of a power failure is determined on the vehicle side, the system is immediately shut down, and, without turning the relay switch 26 OFF, a call signal is transmitted to the power supply device 1 to be put in a state capable of receiving signals, for a predetermined period.

The control of the power supply device side, which receives the call signal, will be described. When receiving a call signal from the vehicle 2 with the wireless communication unit 14, the power supply device side controller 10 cross-checks the identification information of the vehicle 2 included in the call signal and the identification information of the vehicle 2 that is recorded in the memory 13.

If a vehicle that was being supplied power until immediately prior to the occurrence of the power failure is stopped at the parking space of the power supply device 1 until recovery from the occurrence of the power failure, the identification information of the vehicle 2 that is included in the call signal and the identification information of the vehicle 2 that is recorded in the memory 13 will match. Accordingly, if the identification information match, the controller 10 determines that the vehicle 2, which is the transmission destination of the call signal, is the target vehicle to which the power was being supplied at the time of the power failure, and also determines that a request for a power supply is being made again by the vehicle. The controller 10 then establishes a wireless communication with the vehicle of the transmission destination, based on the identification information of the vehicle 2 that is included in the call signal. The controller 10 controls the power unit 12 to restart the non-contact power supply.

On the other hand, if a call signal is transmitted from another vehicle that is stopped at the parking space of another power supply device 1 nearby, the power supply device 1 also receives the call signal from the other vehicle, since a call signal is transmitted by means of a wireless communication. In this case, the identification information included in the call signal and the identification information of the vehicle 2 recorded in the memory 13 will not match.

Additionally, the vehicle 2 that is stopped at the parking space of the power supply device 1 is the vehicle to which the power was being supplied until immediately prior to the occurrence of the power failure, but if the duration of the power failure is longer than the transmission duration of the call signal, the power supply device side controller 10 does not receive the call signal.

Furthermore, if a vehicle that was being supplied power until immediately prior to the occurrence of the power failure exits the parking space of the power supply device 1 before the power failure is restored, or, a vehicle that is different from the vehicle that was being supplied power until immediately prior to the occurrence of the power failure is stopped at the parking space, a call signal is not transmitted from these vehicles.

When a call signal is not being received, the controller 10 controls the power unit 12 and supplies an activation power for activating the system of the controller 20, from the power transmission coil 11 to the power reception coil 21. The activation power can be any size of which the sensor 28 on the vehicle side can detect the power of the power reception coil 21.

When power to the power reception coil 21 is supplied by the activation power from the power supply device 1, the vehicle side activation device 30 activates the controller 20 from a sleep state by detecting a voltage based on the activation power, with the sensor 28. If the duration of the power failure is longer than at least the transmission duration of the call signal, the vehicle side controller 20 is in a sleep state. Even when being restored from an extended power failure to be in a state in which a wireless communication by the wireless communication unit 14 is possible, the power supply device side controller 10 cannot activate the vehicle side controller 20 by the wireless communication, since the vehicle side controller 20 is in a sleep state.

Accordingly, in the present embodiment, in order to accommodate an extended power failure, activation power is supplied from the power transmission coil 11 to the power reception coil 21, in a non-contact manner, if a call signal is not being received. Additionally, in the present embodiment, an activation device 30 for activating the controller 20 is provided on the vehicle side. A controller 20 that enters a sleep state by a power failure can thereby be activated.

The vehicle side controller 20 that is activated by the activation power reads the recorded data of the memory 23. Then, if the identification information of the power supply device 1 is recorded in the memory 23, the controller 20 determines that a power failure has occurred. As described above, if the controller 20 enters a sleep state in the power failure control mode, the identification information of the power supply device 1 of the memory 23 (of the supply source) remains recorded. That is, the identification information of the power supply device 1 of the supply source that is recorded in the memory 23 indicates that the battery 22 was being charged prior to the power failure (in other words, the charging of the battery 22 was stopped due to the power failure), and indicates the power supply device 1, which is the power supply source from which the power was being received prior to the power failure.

If the identification information of the power supply device 1 is recorded in the memory 23, the controller 20 wirelessly transmits a signal including the power failure information and the identification information of the host vehicle. The power failure information indicates that the battery 22 was being charged prior to the power failure, and indicates a request for recharging the battery after the power failure is restored. The identification information of the power supply device 1, which is recorded in the memory 23, may be used as the power failure information.

When receiving a signal including the power failure information and the identification information of the vehicle, the power supply device side controller 10 determines that the charging of the battery 22 of the vehicle 2 of the transmission source was stopped due to a power failure, from the power failure information. The controller 10 cross-checks in the memory 13 the identification information of the vehicle 2 that is transmitted with the power failure information and the identification information of the vehicle 2. When the identification information match, the controller 10 determines that the vehicle of the transmission source of the signal is the target vehicle to which power was being supplied at the time of the power failure.

The controller 10 then establishes a wireless communication with the vehicle 2 of the transmission source based on the identification information and transmits a signal to the vehicle 2. The controller 10 further controls the power unit 12 to restart the non-contact power supply.

When receiving a response signal with respect to the signal including the power failure information from the power supply device 1, the vehicle side controller 20 determines that the power supply device 1 has been restored from the power failure, and restarts the charging control of the battery 22. Then, after the charging is ended, the controller 20 erases the power failure information and the identification information of the power supply device 1 that is recorded in the memory 23.

In addition, the power supply device side controller 10 ends the non-contact power supply by receiving a stop request or the like from the vehicle side. The controller 10 also erases the identification information of the vehicle 2 that is recorded in the memory 13.

Figure 2:
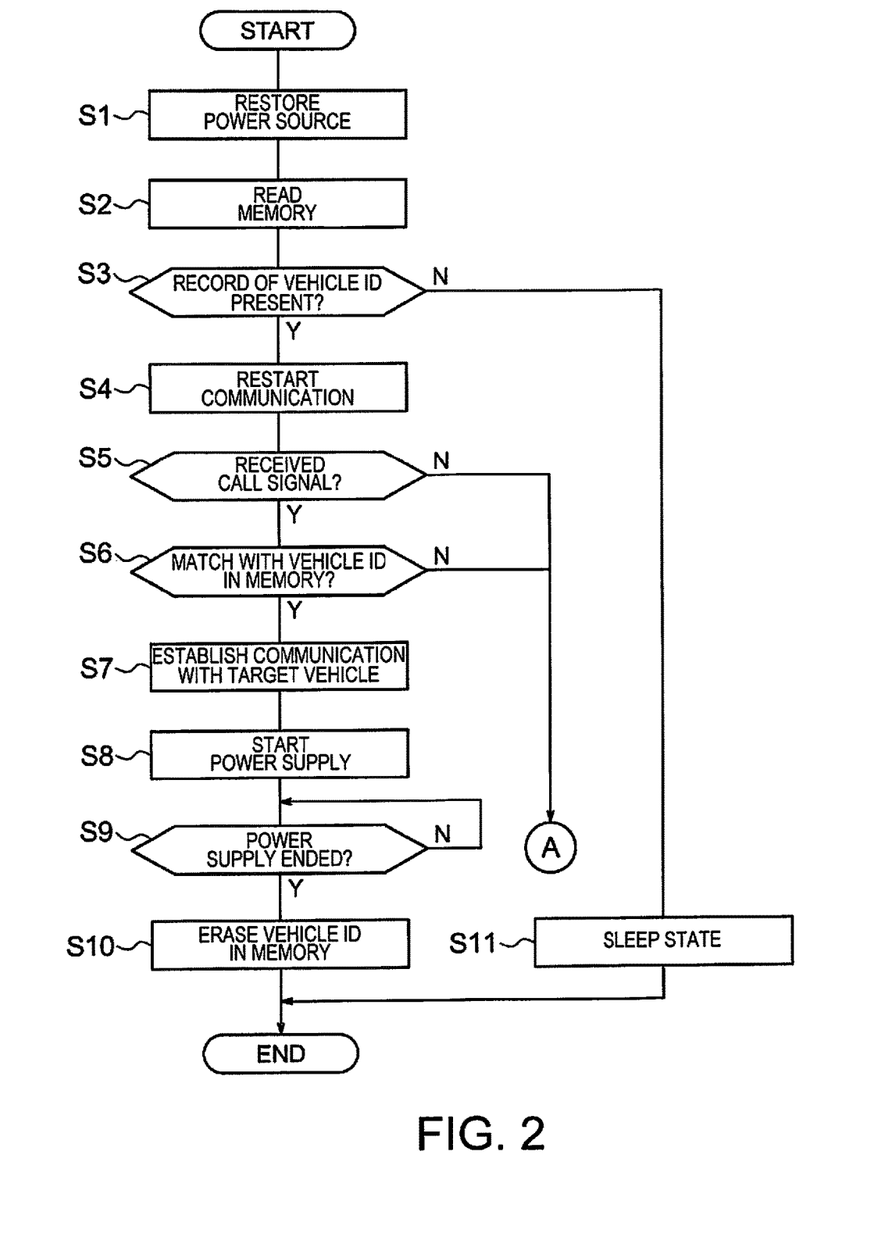
FIG. 2 is a flow chart illustrating the control procedure of the controller on the power supply device side in FIG. 1.
Figure 3:
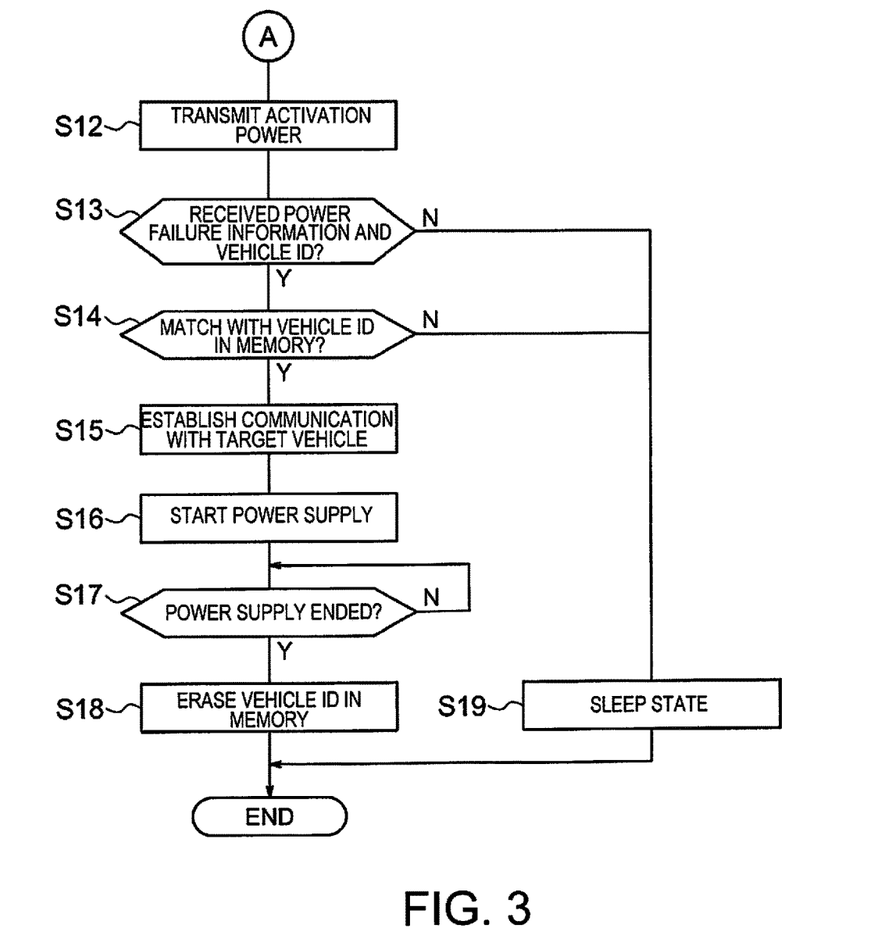
FIG. 3 is a flow chart illustrating the control procedure of the controller on the power supply device side in FIG. 1.

The control procedure of the power supply device side controller 10 after being restored from a power failure will be described next, using FIG. 2 and FIG. 3. FIG. 2 and FIG. 3 describe the control of the controller 10 after being restored from a power failure.

The power source of the power supply device 1 is restored with the ending of the power failure, in step S1. The controller 10 reads the recorded data in the memory 13 in step S2, and the controller 10 determines whether or not the identification information (ID) of the vehicle 2 is recorded in the memory 13, in step S3. If the identification information of the vehicle 2 is not recorded in the memory 13, the controller 10 determines that power was not being supplied to the vehicle 2 at the time of the occurrence of the power failure, enters a sleep mode (step S11), and ends the control.

On the other hand, if the identification information of the vehicle 2 is recorded in the memory 13, the controller 10 activates the communication function of the wireless communication unit 14 and restarts the wireless communication, in step S4. The controller 10 determines whether or not a call signal has been received from the vehicle 2, in step S5.

If a call signal has been received, the controller 10 compares the identification information of the vehicle 2 that is included in the call signal, and the identification information of the vehicle 2 in the memory 13, in step S6. If the identification information match, the controller 10 determines that the target vehicle 2 that transmitted the call signal is a vehicle to which power was being supplied until the occurrence of the power failure, and establishes a one-to-one communication with the target vehicle 2 using the identification information, in step S7. In this case, the specified target vehicle 2 corresponds to the vehicle 2 to which power was being supplied prior to the power failure, when a brief power failure occurs.

The controller 10 controls the power unit 12 to start the power supply, in step S8. The controller 10 determines whether or not the power supply has been stopped, in step S9. When ending the power supply, the controller 10 erases the identification information of the vehicle 2 that has been recorded in the memory and ends the control of the present embodiment, in step S10.

Returning to step S5, if a call signal has not been received, the step proceeds to step S12 illustrated in FIG. 3. Returning to step S6, if the identification information of the vehicle 2 included in the call signal and the identification information of the vehicle 2 recorded in the memory 13 do not match, the step proceeds to step S12 as well.

The controller 10 controls the power unit 12 and outputs an activation power for activating the vehicle side controller 20 from the power transmission coil 11 to the power reception coil 21, in step S12.

The controller 10 determines whether or not a signal including the power failure information and the identification information of the vehicle 2 has been received from the vehicle 2, in step S13. If a signal including the power failure information and the identification information has been received, the controller 10 determines whether or not the received identification information of the vehicle 2 and the identification information of the vehicle 2 in the memory 13 match, in step S14.

If the identification information match, the controller 10 determines that the target vehicle 2 that transmitted the signal, including the power failure information, is a vehicle to which power was being supplied until the occurrence of the power failure, and establishes a one-to-one communication with the target vehicle 2 using the identification information, in step S15. In this case, the specified target vehicle 2 corresponds to the vehicle 2 to which power was being supplied prior to the power failure, when a long-term power failure occurs.

The controller 10 controls the power unit 12 to start the power supply, in step S16. The controller 10 determines whether or the power supply has been stopped, in step S17. When ending the power supply, the controller 10 erases the identification information of the vehicle 2 that has been recorded in the memory 13 and ends the control of the present embodiment, in step S18.

Returning to step S13, if a signal including the power failure information and the identification information of the vehicle 2 has not been received, the controller 10 enters a sleep state (step S11) and ends the control, in step S19. Returning to step S14, if the identification information does not match, the controller 10 enters a sleep state (step S11).

Figure 4:
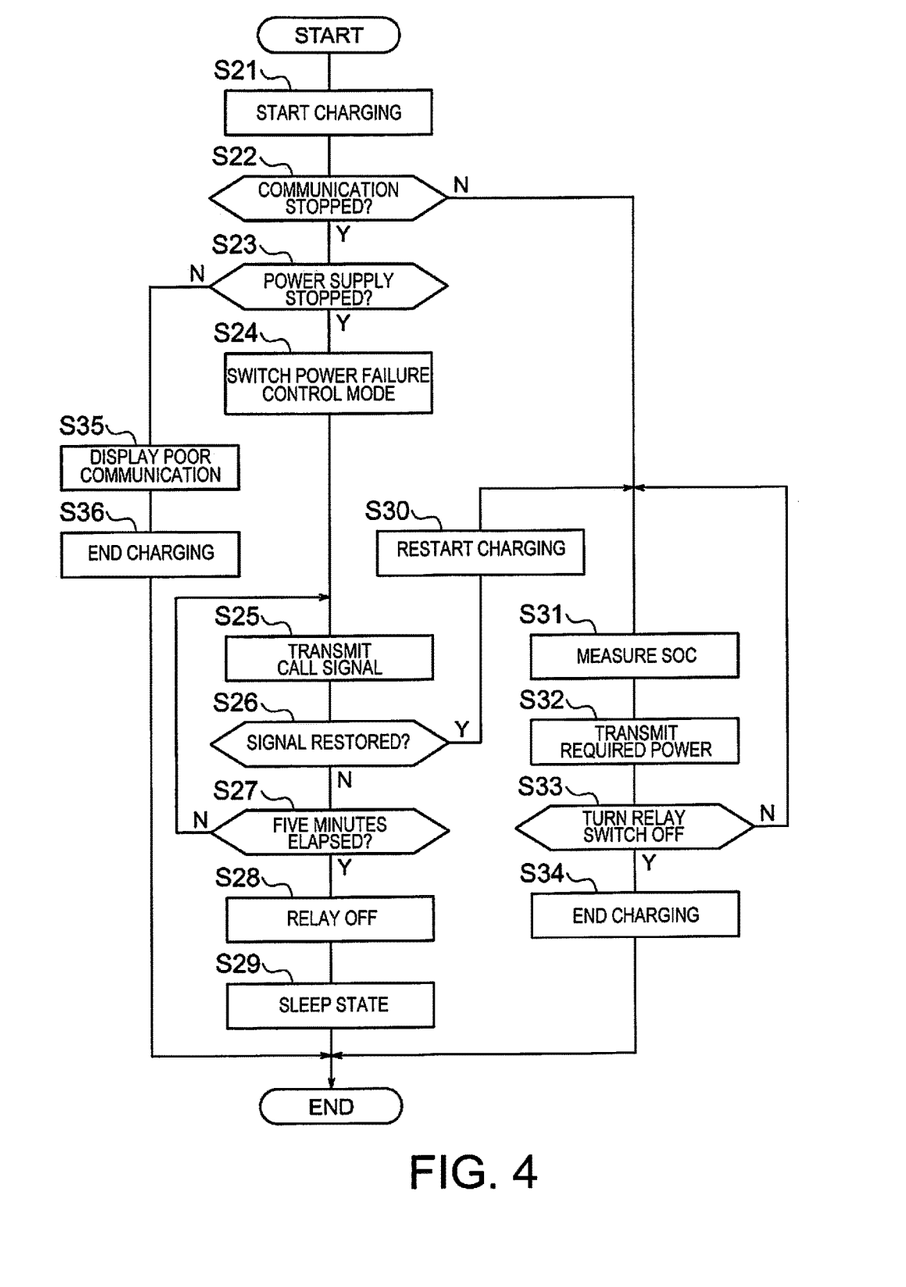
FIG. 4 is a flow chart illustrating the control procedure of the controller on the vehicle side in FIG. 1.
Figure 5:
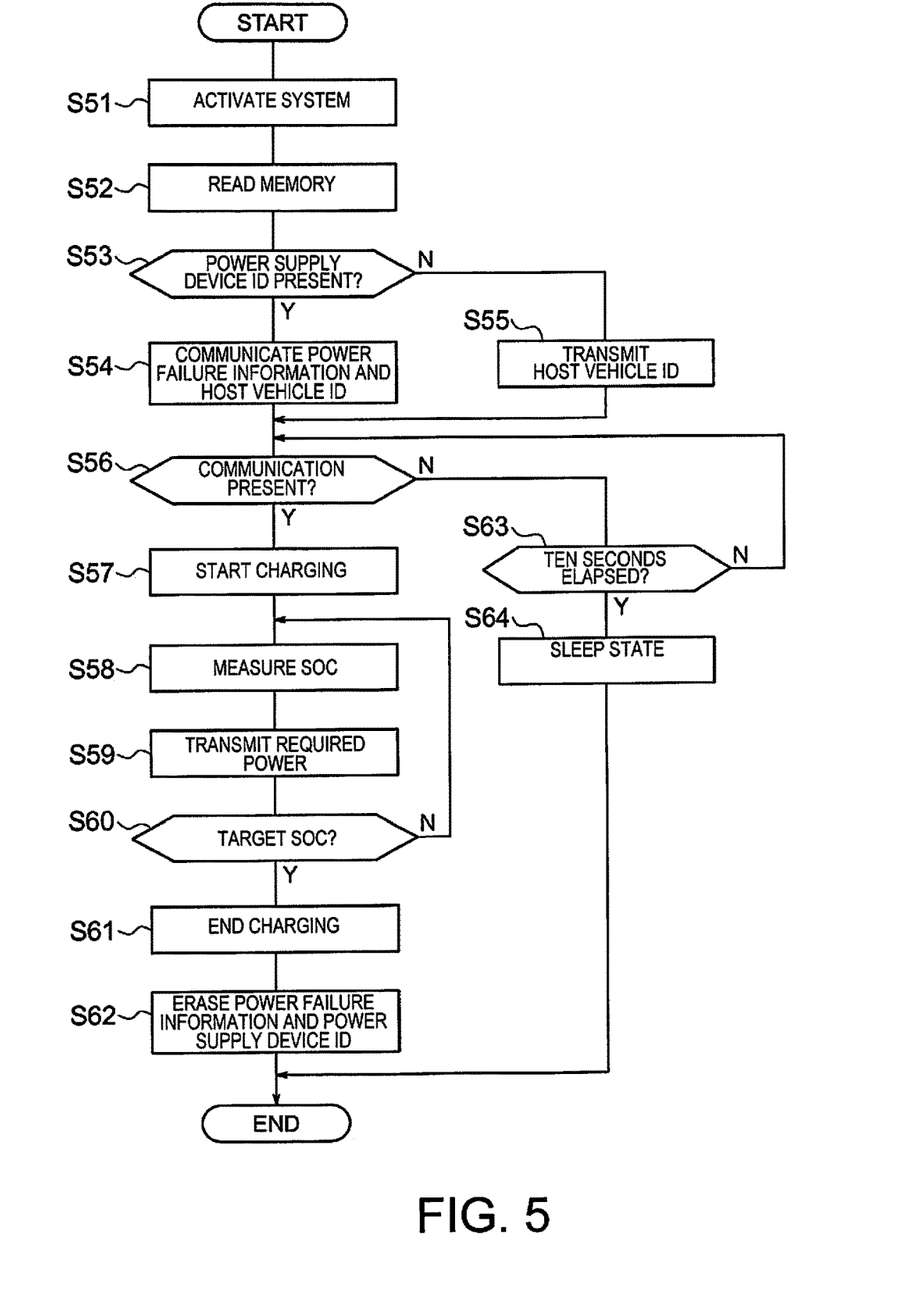
FIG. 5 is a flow chart illustrating the control procedure of the controller on the vehicle side in FIG. 1.

The control procedure of the controller 20 is described next, using FIG. 4 and FIG. 5. FIG. 4 is a flow chart illustrating the control procedure of the controller 20 when the charging control is ended normally after starting the charging of the battery 22, when the charging is ended due to a poor communication, and when ending the control due to an occurrence of a power failure.

The controller 20 turns the relay switch 26 ON and starts to charge the battery 22 by the non-contact power supply, in step S21. The controller 20 determines whether or not the wireless communication function has been stopped, from the presence/absence of the reception of signals by the wireless communication unit 24, in step S22.

If the communication has been stopped, the controller 20 determines whether or not the power supply from the power transmission coil 11 to the power reception coil 21 has been stopped, based on the detection value of the sensor 28, in step S23. If the wireless communication has been stopped and the power supply has been stopped, the controller 20 determines that a power failure has occurred on the power supply device 1 side, and switches to the power failure control mode, in step S24.

The controller 20 transmits a call signal, in step S25. The controller 20 determines whether or not communication has been restored with the power supply device 1, from the presence/absence of a reception of a response signal, in step S26, with respect to the call signal.

If communication has not been restored, the controller 20 determines whether or not a transmission duration has elapsed since the call signal was first transmitted. If the transmission duration has not elapsed, the step returns to step S25.

If the transmission duration has elapsed, the controller 20 turns the relay switch 26 OFF, in step S28. The controller 10 enters a sleep state in step S29.

Returning to step S26, if communication has been restored, the controller 20 controls the power reception circuit 27 and restarts the charging, in step S30. The controller 20 measures the SOC of the battery 22 based on the detection value of the sensor 29, when charging the battery 22, in step S31. The controller 20 transmits the required power corresponding to the state of the battery 22 to the power supply device 1 by wireless communication, in step S32.

The controller 20 determines whether or not the SOC of the battery 22 has reached the target SOC, in step S33. If the SOC has not reached the target SOC, the step returns to step S31. On the other hand, if the SOC has reached the target SOC, the controller 20 turns the relay switch 26 OFF in step S34, and ends the charging.

Returning to step S23, if the power supply from the power transmission coil 11 to the power reception coil 21 has not been stopped, in other words, if there is a power supply but the wireless communication has been stopped, the controller 20 indicates poor communication on the display unit 25, in step S35. In addition, the controller 20 turns the relay switch 26 OFF and ends the control of the present embodiment, in step S36.

The control of the controller 20 when being restored from a long-term power failure will be described next, using FIG. 5.

When detecting that power has been supplied from the power transmission coil 11 to the power reception coil 21 from the detection value of the sensor 28, the activation device 30 activates the system of the controller 20, in step S51. The controller 20 reads the recorded data in the memory 23, in step S52.

The controller 20 determines whether or not the identification information (ID) of the power supply device 1 is recorded in the memory 23, in step S53. If the identification information of the power supply device 1 is recorded in the memory 23, the controller 20 wirelessly transmits a signal including the power failure information and the identification information of the host vehicle, in step S54. On the other hand, if the identification information of the power supply device 1 is not recorded in the memory 23, the controller 20 wirelessly transmits a signal including the identification information of the host vehicle, in step S55.

The controller 20 determines whether or not there is a communication from the power supply device 1, from the presence/absence of the reception of a response signal, in step S56. If there is a communication, the controller 20 turns the relay switch 26 ON and starts to charge the battery 22, in step S57. Since the control from step S58 to step S61 is the same as from step S31 to step S34, the description thereof will be omitted.

After step S61, the controller 20 erases the power failure information and the identification information of the power supply device 1 that is recorded in the memory 23, and ends the control of the present embodiment, in step S62.

Returning to step S56, if there is no communication from the power supply device 1, the controller 20 determines whether or not a predetermined period (for example 10 seconds) has elapsed, in step S63. If the predetermined period has not elapsed, the step returns to step S56. If the predetermined time has elapsed, the controller 20 enters a sleep state and ends the control of the present embodiment, in step S64.

As described above, in the present invention, the vehicle identification information during the supplying of power or during the preparation for supplying power to the power reception coil 21 is recorded to a power supply side recording means, and the vehicle identification information and the transmission information that is transmitted from the vehicle are cross-checked, if the power supply is stopped before the power supply to the power reception coil 21 is ended normally. The fact that a power failure has occurred can thereby be grasped on the power supply device side from the information that is recorded in the memory 13. Additionally, since the vehicle information that is transmitted from the vehicle and the identification information in the memory 13 are cross-checked, the vehicle that is the transmission source of the vehicle information can be grasped as the target vehicle to which power was being supplied at the time of the power failure.

Additionally, in the present invention, if the power supply is stopped before the power supply to the power reception coil 21 is ended normally, the identification information of the vehicle has remained in the memory 13; the controller 10 determines the presence/absence of a power failure by cross-checking the transmission information that is transmitted from the vehicle and the vehicle identification information. The fact that a power failure has occurred can thereby be grasped, and the vehicle that is the transmission source of the vehicle information can be grasped as the target vehicle to which the power was being supplied at the time of the power failure. Furthermore, since the identification information has remained in the memory 13, the coupling control can be omitted upon again supplying power.

In addition, in the present embodiment, the non-contact power supply from the power transmission coil 11 to the power reception coil 21 is restarted if the identification information of the vehicle 2 included in the vehicle information and the identification information of the vehicle 2 recorded in the memory 13 match. The power can be supplied again to the vehicle 2 to which power was not supplied due to the power failure.

Additionally, in the present embodiment, the identification information of the power supply device 1 is recorded in the memory 23 during the charging or during the preparation for the charging, of the battery 22. The fact that the contact with the non-contact power supply was ended due to a power failure can thereby be grasped on the vehicle side, from the information that is recorded in the memory 23.

In addition, in the present embodiment, an activation device 30 for activating the controller 20 based on the detection value of the sensor 28, is provided to the vehicle 2. The vehicle side controller 20 can thereby be activated by the non-contact power supply from the power supply device 1, if the vehicle side system enters a sleep state due to an occurrence of a power failure.

In the present embodiment, the identification information of the vehicle 2 is kept in the power supply device side memory 13 and the identification information of the power supply device 1 is kept in the vehicle side memory 23, at the time of the occurrence of a power failure; however, instead of the identification information, a flag (information) indicating that the power was being supplied until the time of the occurrence of a power failure, may be kept in the memory 13, and a flag (information) indicating that a battery 22 was being charged until the time of the occurrence of the power failure, may be kept in the memory 23. The fact that the power supply device 1, which is the transmission source of the flag, was stopped due to the power failure can thereby be grasped by receiving a flag that is recorded in the memory 13 on the vehicle side. In addition, the fact that vehicle 2, which is the transmission source of the flag and which is stopped in the parking space, is the vehicle in which the charging was interrupted due to the power failure can be grasped by receiving a flag that is recorded in the memory 23 on the power supply device side.

Upon resuming the non-contact power supply after being restored from a power failure, the fact that the power supply (or charge) was interrupted due to the occurrence of the power failure is shared between the power supply device 1 and the vehicle 2, by transmitting and receiving flags. Then, the power supply device side controller 10 can grasp that a power failure has occurred, and that the vehicle 2, which is the transmission source of the flag, is the target vehicle to which power was being supplied at the time of the power failure, by cross-checking the flag that is recorded in the memory 13 and the flag that is transmitted from the vehicle. In addition, the vehicle side controller 20 can grasp that a power failure has occurred, and that the vehicle 2, which is the transmission source of the flag, is the target vehicle to which power was being supplied at the time of the power failure, by cross-checking the flag that is recorded in the memory 23 and the flag that is transmitted from the power supply device 1.

In the present embodiment, the identification information of the vehicle 2 is recorded in the memory 13 and the identification information of the power supply device 1 is recorded in the memory 23 at the time of the establishment of the coupling; however, recording can also take place after the establishment of coupling. For example, the controller 20 may record the identification information in the memory 23 when confirming an operation to charge the battery 22, and the controller 10 may record the identification information when receiving a request signal for starting a power supply based on the operation. Alternatively, if a timer setting for charging has been set, the controller 20 may record the identification information in the memory 23 at the time that is set in the timer. The controller 10 may record the identification information when receiving a request signal for a power supply based on the timer setting.

The wireless communication unit 14 described above corresponds to the "power supply side communication means" of the present invention, the memory 23 corresponds to the "power supply side recording means" of the present invention, the controller 10 corresponds to the "power supply side controller" of the present invention, the controller 20 corresponds to the "vehicle side controller" of the present invention, the sensor 28 corresponds to the "detection means" of the present invention, and the activation device 30 corresponds to the "activation means" of the present invention. Furthermore, the information included in the call signal, or, at least one piece of information of the power failure information, corresponds to the "vehicle information" of the present invention.

The invention claimed is:

1. A non-contact power supply system that supplies power between a power reception coil that is provided to a vehicle and a power transmission coil that is provided to a power supply device in a non-contact manner by means of at least a magnetic coupling, the non-contact power supply system comprising the power supply device,
   the power supply device comprising:
   a power supply side recording circuit configured to record the vehicle identification information, which represents the identification information of the vehicle;
   a power supply side communication circuit being configured to perform the communication with the vehicle; and
   a power supply side controller for controlling power that is outputted from a power source to the power transmission coil,
   the vehicle identification information being recorded in the power supply side recording circuit is the vehicle identification information of the vehicle in which a paired communication has been wirelessly established between the power supply device and the vehicle prior to every time charging power is supplied, a confirmation signal of the paired communication being established being transmitted from the vehicle to the power supply side controller before the vehicle identification information is recorded in the power supply side recording circuit, and
   the power supply side controller being configured to cross-check the vehicle identification information that is transmitted from the vehicle after stopping the power supply and the vehicle identification information that is recorded in the power supply side recording circuit, if the power supply is stopped before the power supply to the power reception coil is ended normally, and restarts the non-contact power supply from the power transmission coil to the power reception coil, if the vehicle identification information match.

2. The non-contact power supply system according to claim 1, wherein
   the vehicle comprises:
   a vehicle side recording circuit configured to record the power supply device identification information, which represents the identification information of the power supply device;
   a vehicle side communication circuit configured to perform the communication with the power supply device;
   a battery charged by the power received from the power reception coil; and
   a vehicle side controller for controlling the charging of the battery, and
   the power supply device identification information being recorded in the vehicle side recording circuit during charging or during preparation for charging of the battery.

3. The non-contact power supply system according to claim 2, wherein
   if the power supply is stopped before the power supply to the power reception coil is ended normally,
   the power supply device identification information is kept in the vehicle side recording circuit.

4. The non-contact power supply system according to claim 1, wherein
   the vehicle comprises:
   a battery charged by the power received from the power reception coil;
   a vehicle side controller for controlling the charging of the battery;
   a detector being configured to detect power that is received by the power reception coil; and
   an activator being configured to activate the vehicle side controller, based on the detection value of the detector.

5. The non-contact power supply system according to claim 1, wherein
   the vehicle identification information is kept in the power supply side recording circuit if the power supply is stopped before the power supply to the power reception coil is ended normally.

6. The non-contact power supply system according to claim 2, wherein
   the vehicle comprises:
   a battery charged by the power received from the power reception coil;
   a vehicle side controller for controlling the charging of the battery;
   a detector being configured to detect power that is received by the power reception coil; and
   an activator being configured to activate the vehicle side controller, based on the detection value of the detector.

7. The non-contact power supply system according to claim 3, wherein
   the vehicle comprises:
   a battery charged by the power received from the power reception coil;
   a vehicle side controller for controlling the charging of the battery;
   a detector being configured to detect power that is received by the power reception coil; and
   an being configured to activate the vehicle side controller, based on the detection value of the detector.

8. The non-contact power supply system according to claim 2, wherein the vehicle identification information is kept in the power supply side recording circuit if the power supply is stopped before the power supply to the power reception coil is ended normally.

9. The non-contact power supply system according to claim 3, wherein
the vehicle identification information is kept in the power supply side recording circuit if the power supply is stopped before the power supply to the power reception coil is ended normally.

10. The non-contact power supply system according to claim 4, wherein
the vehicle identification information is kept in the power supply side recording circuit if the power supply is stopped before the power supply to the power reception coil is ended normally.

11. The non-contact power supply system according to claim 1, wherein
the power supply side communication circuit being configured to wirelessly perform the communication with the vehicle.

12. The non-contact power supply system according to claim 1, wherein
the power supply side controller being configured to cross-check responsive to receiving a signal from the vehicle indicating a power failure.

\* \* \* \* \*